(12) United States Patent
Okabe

(10) Patent No.: US 8,185,595 B2
(45) Date of Patent: May 22, 2012

(54) INFORMATION PROCESSING APPARATUS AND CONTROL METHOD THEREOF

(75) Inventor: Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 12/652,677

(22) Filed: Jan. 5, 2010

(65) Prior Publication Data

US 2010/0198782 A1   Aug. 5, 2010

(30) Foreign Application Priority Data

Feb. 2, 2009 (JP) ................................ 2009-021744

(51) Int. Cl.
*G06F 15/16* (2006.01)
*G06F 12/00* (2006.01)

(52) U.S. Cl. ........................................ 709/206; 707/821

(58) Field of Classification Search .................. 709/206, 709/207; 707/821, 822, 827, 687; 719/315
See application file for complete search history.

(56) References Cited

U.S. PATENT DOCUMENTS

| | | | | |
|---|---|---|---|---|
| 5,369,778 A | * | 11/1994 | San Soucie et al. | 1/1 |
| 5,634,124 A | * | 5/1997 | Khoyi et al. | 1/1 |
| 2006/0206570 A1 | | 9/2006 | Heidloff et al. | |
| 2006/0277229 A1 | | 12/2006 | Yoshida et al. | |

FOREIGN PATENT DOCUMENTS

| | | |
|---|---|---|
| CN | 1831827 A | 9/2006 |
| CN | 101344881 A | 1/2009 |
| JP | 2003223404 A | 8/2003 |
| JP | 2006301746 A | 11/2006 |
| JP | 2007011730 A | 1/2007 |

OTHER PUBLICATIONS

Chinese Office Action dated Jul. 21, 2001 in corresponding Chinese Application No. 201010103172.3, and English language translation thereof.

* cited by examiner

*Primary Examiner* — Tony Mahmoudi
*Assistant Examiner* — Md. I Uddin
(74) *Attorney, Agent, or Firm* — Fitzpatrick, Cella, Harper & Scinto

(57) ABSTRACT

This invention is directed to reduce errors which may occur upon moving link data referring to another electronic data. To accomplish this, an information processing apparatus includes a designating unit which designates electronic data to be moved or copied, a data type determining unit which determines whether the designated electronic data is link data, an acquisition determining unit which, when it is determined that the designated electronic data is link data, determines whether electronic data linked to the link data can be acquired, and a file processing unit which, when it is determined that electronic data can be acquired, acquires the electronic data and moves or copies copy data of the acquired electronic data instead of the link data.

9 Claims, 16 Drawing Sheets

FIG. 15

| 1301 | 1302 |
|---|---|
| LINK INFORMATION BEFORE CONVERSION | CONVERTED LINK INFORMATION |
| X:\data\test.doc | \\test.xxxxx.co.jp\datatest.doc |

INFORMATION PROCESSING APPARATUS AND CONTROL METHOD THEREOF

BACKGROUND OF THE INVENTION

1. Field of the Invention

The present invention relates to an electronic data management technique and, more particularly, to an electronic data processing technique having link information to external electronic data.

2. Description of the Related Art

Recent electronization of documents are promoting introduction of document data management systems to offices to manage electronic data. In general, the document data management system comprehensively manages document data stored in various devices. The user can execute operations such as search, browsing, and download for stored document data.

The document data management system can create a file (link data) containing link information to access another file (actual file), similar to a file system for an operating system (OS). That is, link data holds not actual data but only referring information (path information) to another file. The use of link data can prevent the existence of many electronic data with the same contents. The disk capacity and the network traffic in electronic data operation can be reduced.

However, the following problem occurs when link data referring to an actual file in a given client PC (PC1) is copied or moved to a shared disk on a network or is attached to mail and sent. More specifically, when another client PC (PC2) different from the PC1 uses the link data, it cannot access an actual file or accesses another erroneous actual file.

To solve this problem, for example, Japanese Patent Laid-Open No. 2006-301746 discloses a technique of checking whether there is information at a link destination, and if there is no such information, deleting the link information. Japanese Patent Laid-Open Nos. 2003-223404 and 2007-011730 disclose techniques of, when attaching link data to e-mail and sending it, switching which of link data and an actual file at the referring destination is to be attached to e-mail. The determination is made especially based on the connection status of the transmission destination and the presence/absence of a right to access the referring destination of link data.

According to the conventional techniques, however, to properly use link data and an actual file, it is necessary to mange user information in a server or set in advance a condition for the proper use. Also, the conventional techniques do not consider a case in which a so-called structured file containing one or more files includes a link information file mentioned above. When a structured file is exchanged between different devices, it sometimes becomes impossible to refer to a link destination.

SUMMARY OF THE INVENTION

According to one aspect of the present invention, an information processing apparatus connected to a communication network, the apparatus comprises: a designating unit which designates electronic data to be moved or copied to a predetermined data storing position; a data type determining unit which determines whether the electronic data designated by the designating unit is link data to another electronic data; an acquisition determining unit which, when the data type determining unit determines that the electronic data designated by the designating unit is link data to another electronic data, determines whether the other electronic data linked to the link data can be acquired; and a file processing unit which, when the acquisition determining unit determines that the other electronic data can be acquired, acquires the other electronic data and moves or copies a copy of the other electronic data to the predetermined data storing position instead of the link data.

According to another aspect of the present invention, an information processing apparatus connected to a communication network, the apparatus comprises: a designating unit which designates electronic data to be moved or copied to a predetermined data storing position; a data type determining unit which determines whether the electronic data designated by the designating unit is either of link data to another electronic data and structured data containing the link data; a path information determining unit which, when the data type determining unit determines that the electronic data designated by the designating unit is either of link data to another electronic data and structured data containing the link data, determines whether path information to the other electronic data contained in the link data is local path information used by only the information processing apparatus; an acquisition unit which, when the path information determining unit determines that the path information is local path information, acquires universal path information representing the data storing position commonly used via the communication network; and a file processing unit which, when the acquisition unit has acquired the universal path information representing the data storing position, moves or copies, to the predetermined data storing position, either of link data obtained by replacing the path information with the universal path information and structured data containing the link data, and when the acquisition unit has not been able to acquire the universal path information representing the data storing position, moves or copies, to the predetermined data storing position, either of copy data of the other electronic data representing the path information and structured data containing the copy data.

According to still another aspect of the present invention, an information processing apparatus which is connected to a communication network and can send e-mail, the apparatus comprises: a designating unit which designates electronic data to be attached to e-mail; a data type determining unit which determines whether the electronic data designated by the designating unit is either of link data to another electronic data and structured data containing the link data; a path information determining unit which, when the data type determining unit determines that the electronic data designated by the designating unit is either of link data to another electronic data and structured data containing the link data, determines whether path information to the other electronic data contained in the link data is local path information used by only the information processing apparatus; an acquisition unit which, when the path information determining unit determines that the path information is local path information, acquires universal path information representing the data storing position commonly used via the communication network; and a mail sending unit which, when the acquisition unit has acquired the universal path information representing the data storing position, attaches, to the e-mail, either of link data obtained by replacing the path information with the universal path information and structured data containing the link data and sends the e-mail, and when the acquisition unit has not been able to acquire the universal path information representing the data storing position, attaches, to the e-mail, either of copy data of the other electronic data representing the path information and structured data containing the copy data and sends the e-mail.

According to yet another aspect of the present invention, a method of controlling an information processing apparatus connected to a communication network, the method comprises: designating electronic data to be moved or copied to a predetermined data storing position; determining whether the electronic data designated in the step of designating electronic data is link data to another electronic data; when the electronic data designated in the step of designating electronic data is determined in the step of determining whether the electronic data is link data, to be link data to another electronic data, determining whether the other electronic data linked to the link data can be acquired; and when the other electronic data is determined in the step of determining whether the other electronic data can be acquired, to be able to be acquired, acquiring the other electronic data and moving or copying copy data of the other electronic data to the predetermined data storing position instead of the link data.

According to still yet another aspect of the present invention, a method of controlling an information processing apparatus connected to a communication network, the method comprises: designating electronic data to be moved or copied to a predetermined data storing position; determining whether the electronic data designated in the step of designating electronic data is either of link data to another electronic data and structured data containing the link data; when the electronic data designated in the step of designating electronic data is determined in the step of determining whether the electronic data is either of link data and structured data, to be either of link data to another electronic data and structured data containing the link data, determining whether path information to the other electronic data contained in the link data is local path information used by only the information processing apparatus; when the path information is determined in the step of determining whether path information is local path information, to be local path information, acquiring universal path information representing the data storing position commonly used via the communication network; and when the universal path information representing the data storing position has been acquired in the step of acquiring universal path information, moving or copying, to the predetermined data storing position, either of link data obtained by replacing the path information with the universal path information and structured data containing the link data, and when the universal path information representing the data storing position has not been able to be acquired in the step of acquiring universal path information, moving or copying, to the predetermined data storing position, either of copy data of the other electronic data representing the path information and structured data containing the copy data.

According to yet still another aspect of the present invention, a method of controlling an information processing apparatus which is connected to a communication network and can send e-mail, the method comprises: designating electronic data to be attached to e-mail; determining whether the electronic data designated in the step of designating electronic data is either of link data to another electronic data and structured data containing the link data; when the electronic data designated in the step of designating electronic data is determined in the step of determining whether the electronic data is either of link data and structured data, to be either of link data to another electronic data and structured data containing the link data, determining whether path information to the other electronic data contained in the link data is local path information used by only the information processing apparatus; when the path information is determined in the step of determining whether path information is local path information, to be local path information, acquiring universal path information representing the data storing position commonly used via the communication network; and when the universal path information representing the data storing position has been acquired in the step of acquiring universal path information, attaching, to the e-mail, either of link data obtained by replacing the path information with the universal path information and structured data containing the link data and sending the e-mail, and when the universal path information representing the data storing position has not been able to be acquired in the step of acquiring universal path information, attaching, to the e-mail, either of copy data of the other electronic data representing the path information and structured data containing the copy data and sending the e-mail.

The present invention can provide a technique capable of reducing errors such as a reference failure which may occur upon moving link data referring to another electronic data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a table exemplifying link information;

DESCRIPTION OF THE EMBODIMENTS

Preferred embodiments of the present invention will now be described in detail with reference to the drawings. It should be noted that the following embodiments are merely examples and do not limit the scope of the present invention.

First Embodiment

A client PC which executes a document management client application program (to be simply referred to as a document management client) will be explained as the first embodiment of an information processing apparatus according to the present invention.

<Definitions of Terms>

Link file (link data): a file having link information (path information) to a given file (actual file) in order to access this file.

Structured file (structured data): a file containing one or more other files (including a link file).

Local disk: a storage area directly connected to a PC in which the document management client runs.

Remote disk: a storage area which is not directly connected to a PC in which the document management client runs and is accessible via a network or the like.

Cabinet: a document management area used by the document management client. A cabinet present in a local disk will be called a local cabinet. A cabinet which resides in a document management server and is accessible commonly from another client will be called a shared cabinet.

Local path information: link information (path information) available by only a specific client PC.

Universal path information: link information (path information) commonly used by devices in the document management system (devices in the network).

<System Configuration>

Figure 1:
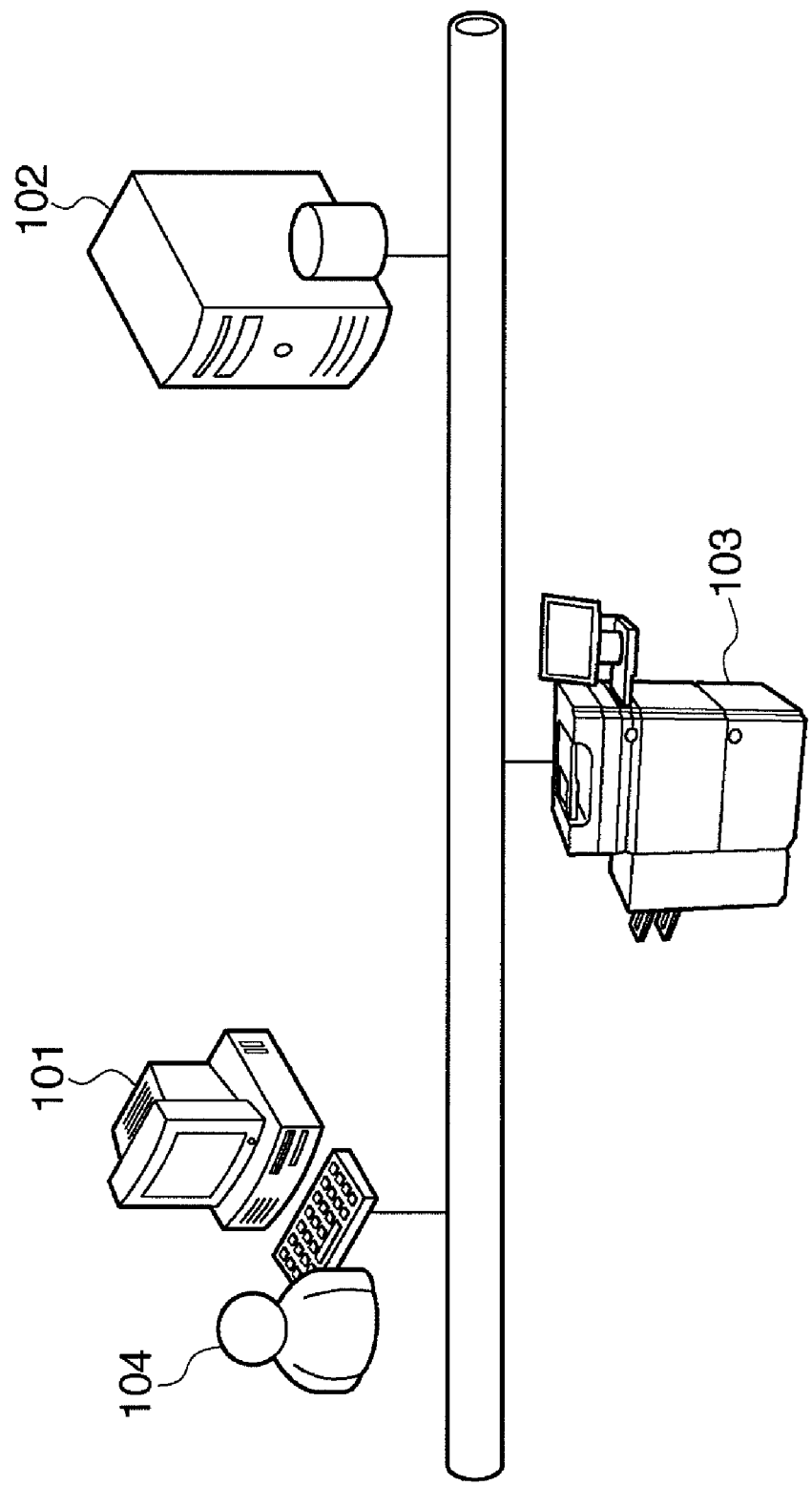
FIG. 1 is a view of the overall configuration of a document management system according to the first embodiment.

FIG. 1 is a view of the overall configuration of a document management system according to the first embodiment. In the document management system, a client PC 101 in which a document management client 301 runs, a document management server PC 102, and a network multifunction peripheral 103 are connected to be able to communicate with each other via a communication network. A user 104 operates the document management client 301.

By operating the document management client 301, the user 104 can operate files in cabinets in the client PC 101, document management server PC 102, and network multifunction peripheral 103. The document management client 301 can access the file system of a local disk. The document management client 301 can also access remote disks provided by the document management server PC 102 and network multifunction peripheral 103.

FIG. 1 shows only one client PC 101, but a plurality of client PCs 101 may exist on the network. The document management client 301 may be configured as an application dedicated to access the document management system or a Web application which runs on a Web browser.

<Hardware Configuration of Client PC>

Figure 2:
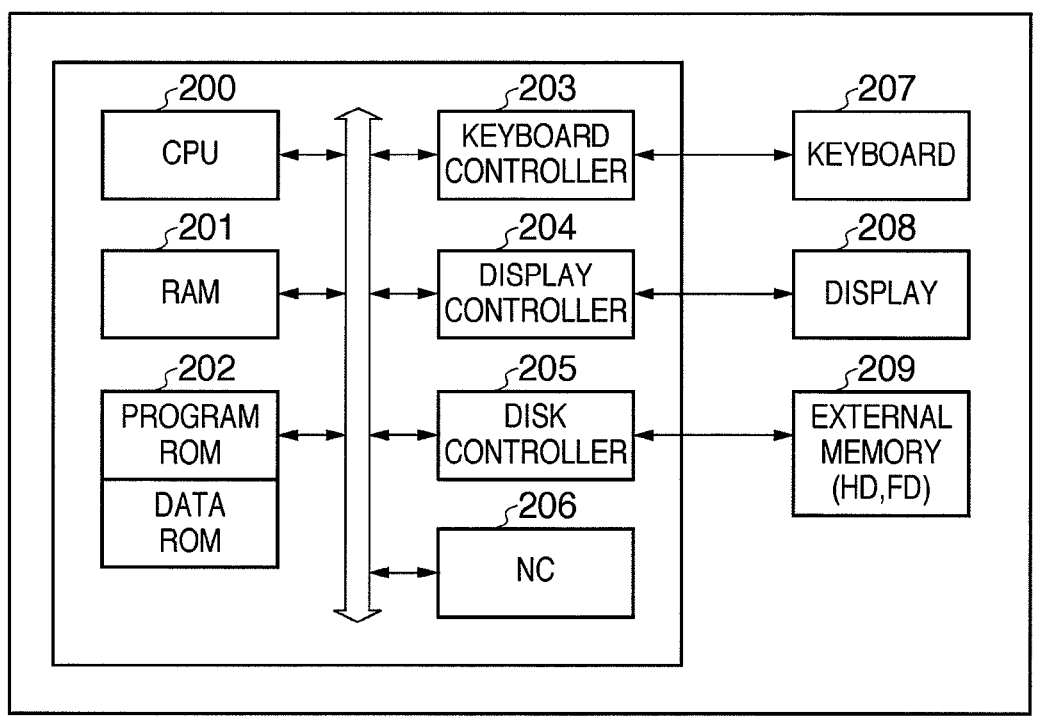
FIG. 2 is a block diagram of the hardware configuration of a client PC.

FIG. 2 is a block diagram of the hardware configuration of the client PC. The hardware configuration shown in FIG. 2 corresponds to that of a general information processing apparatus (PC).

A CPU 200 executes an OS and various application programs including document management client stored in the program ROM of a ROM 202 or loaded from a hard disk (HD) 209 to a RAM 201. The OS stands for an operating system. The processing of each flowchart (to be described later) is achieved by executing the document management client by the CPU 200.

The RAM 201 functions as a main memory, work area, and the like for the CPU 200. A keyboard controller 203 controls key inputs from a keyboard 207 and a pointing device (not shown). A display controller 204 controls display on various kinds of displays (display 208). A disk controller 205 controls data access to the hard disk 209, a floppy® disk, and the like which store a variety of data. An NC 206 is connected to a network and executes communication control processing for another network-connected device.

<Functional Block Configuration of Document Management System>

Figure 3:
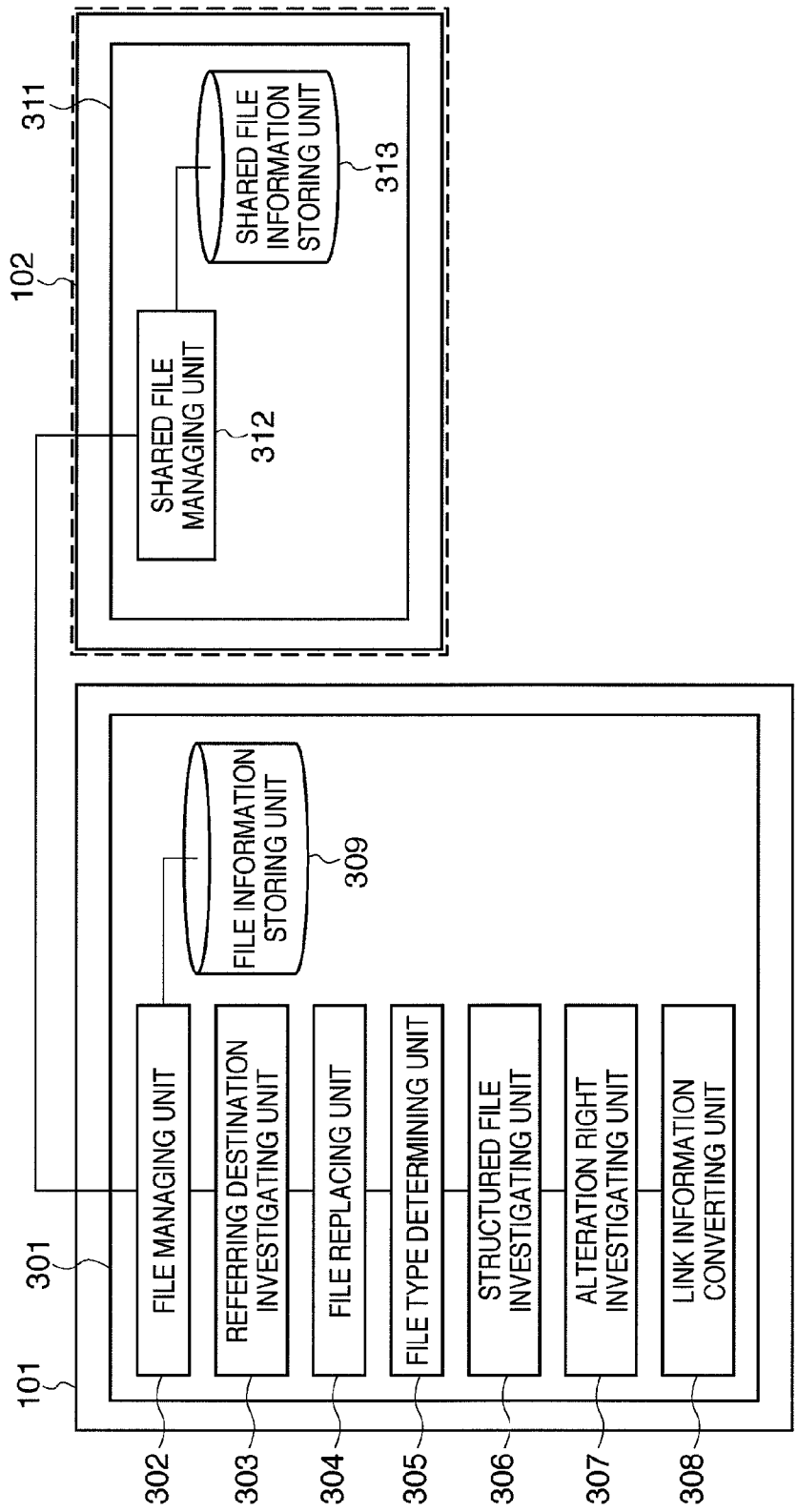
FIG. 3 is a block diagram showing the functional block configuration of the document management system according to the first embodiment.

FIG. 3 is a block diagram showing the functional block configuration of the document management system according to the first embodiment. FIG. 3 particularly shows the software configuration of the document management client 301 running on the client PC 101, and that of a document management server application program (to be simply referred to as a document management server) running on the document management server PC 102. The building components shown in FIG. 3 are extracted from parts associated with the present invention, and the document management system includes other building components.

The CPU 200 executes the document management client 301 to implement a file managing unit 302, referring destination investigating unit 303, file replacing unit 304, file type determining unit 305, structured file investigating unit 306, alteration right investigating unit 307, link information converting unit 308, and file information storing unit 309.

The file managing unit 302 controls copy or move of a file based on an instruction from a user via the keyboard 207 or a pointing device (not shown). Note that "copy of a file" includes importing a file from outside the document management client 301, that is, from a file system managed by the OS to the document management client 301. As described in <System Configuration>, the document management client 301 can operate both the cabinet and file system, and the local disk and remote disk can be operation targets. The file managing unit 302 can copy a target file regardless of whether the target file exists in a cabinet or file system or in a local disk or remote disk.

The referring destination investigating unit 303 is a functional unit which investigates the referring destination of a link file to determine whether an actual file corresponding to the link file exists in a local disk or remote disk. The referring destination investigating unit 303 may be configured to determine whether an actual file at the referring destination of a link file can be actually acquired (acquisition determining unit). This can be achieved by making an inquiry to the OS on the document management server PC 102 or client PC 101. For example, when "X:\data\test.doc" in the file system is set as a referring destination, the referring destination investigating unit 303 inquires of the OS whether the storage area of the drive letter "X" is a local disk or remote disk.

The file replacing unit 304 (file processing unit) is a functional unit which, when it is determined that the referring destination of a link file is a local disk, replaces the link file to be copied with an actual file at the referring destination of the link file.

The file type determining unit 305 (data type determining unit) is a functional unit which determines whether a file to be copied or moved is a link file, a structured file, or neither of them.

The structured file investigating unit 306 is a functional unit which investigates a file contained in a structured file. In particular, the structured file investigating unit 306 investigates whether a structured file contains a link file.

The alteration right investigating unit 307 is a functional unit which investigates whether a user who operates the client PC 101 has a right to alter a file contained in a structured file.

That is, the alteration right investigating unit 307 investigates whether replacement with an actual file by the file replacing unit 304 is possible.

The link information converting unit 308 is a functional unit which rewrites link information held in a link file so that the user can normally access a predetermined actual file by using a copied or moved link file. More specifically, when link information held in a link file is local path information used by only the client PC 101, the link information converting unit 308 rewrites the local path information into universal path information commonly used by devices (terminals) in the document management system.

The file information storing unit 309 is a functional unit which manages and saves a file usable by the document management client 301 in the client PC 101. Data managed by the file information storing unit 309 is local cabinet data when viewed from the document management client 301.

The CPU of the document management server PC 102 executes the document management server to implement a shared file managing unit 312 and shared file information storing unit 313.

The shared file managing unit 312 is a functional unit which manages input/output of files to/from the document management server. For example, when the document management client 301 copies a file from the local cabinet to the shared cabinet, the file managing unit 302 copies it to the shared file managing unit 312.

The shared file information storing unit 313 is a functional unit which manages and saves a file usable by a document management client 301 in the document management server PC 102. Data managed by the shared file information storing unit 313 is shared cabinet data when viewed from the document management client 301.

<Processes in Document Management System>

Processes in the document management system according to the first embodiment will be described in detail with reference to FIGS. 4 to 12.

<Pattern 1: Copy Processing of Link File>

Figure 4:
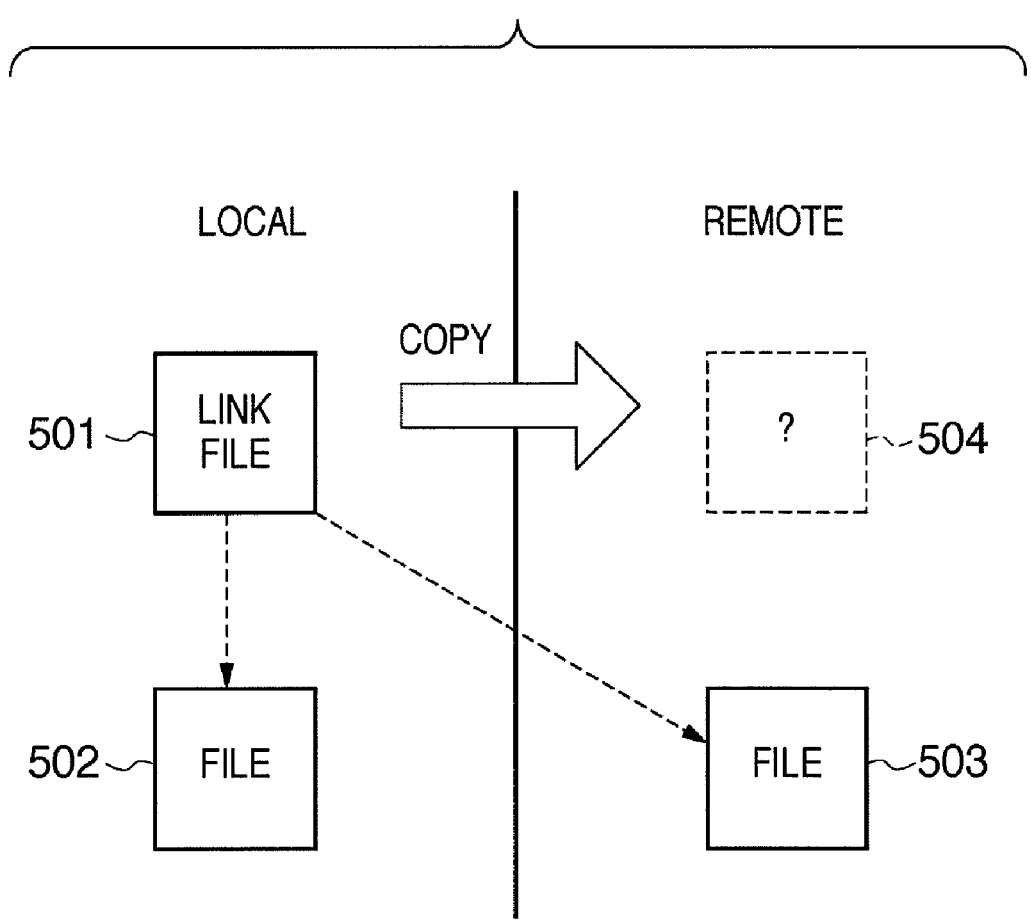
FIG. 4 is a conceptual view of copy processing of a link file.

FIG. 4 is a conceptual view of copy processing of a link file. Processing upon accepting an instruction from the user to copy (or move) a link file from a local disk to a remote disk will be explained. In this case, a link file 501 resides in the local disk, and the referring destination of the link file 501 is a file 502 in the local disk or a file 503 in the remote disk.

Figure 5:
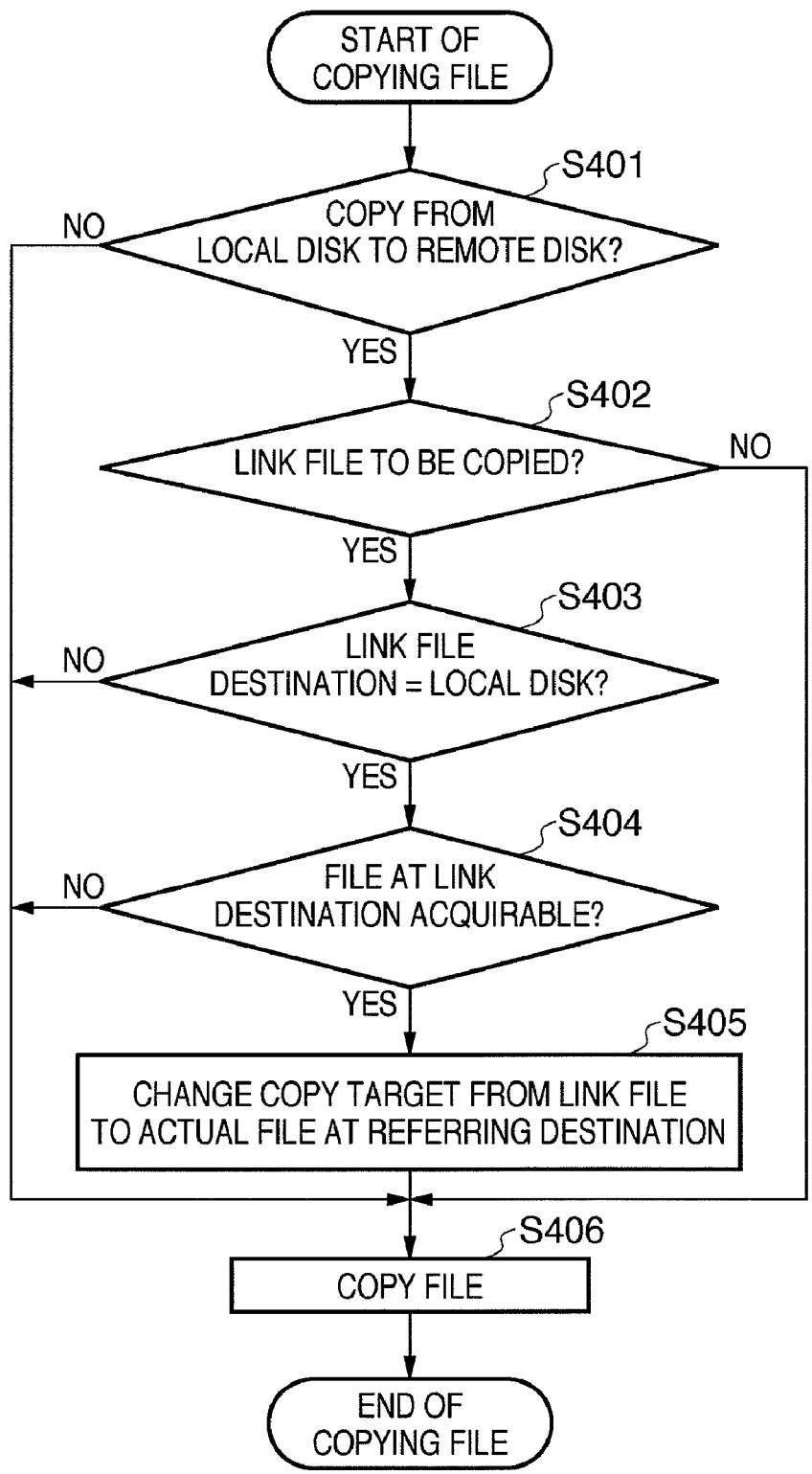
FIG. 5 is an operation flowchart of copy processing of a link file.

FIG. 5 is an operation flowchart of processing to copy a link file from the local disk to the remote disk in the document management client 301. The following processing is executed when the user designates copy processing of a file (electronic data) to a predetermined data storing position.

In step S401, the file managing unit 302 determines whether copy processing designated by the user is copy processing of a file from the local disk to the remote disk. The file managing unit 302 functions as a sharing determining unit which determines whether to copy a file to a shared storing position where another terminal on the network can refer to the file. This determination does not depend on whether the copy source and copy destination are the file system or cabinet. If YES in step S401, the process advances to step S402; if NO, to step S406.

In step S402, the file type determining unit 305 determines whether the file to be copied is a link file. If YES in step S402, the process advances to step S403; if NO, to step S406.

In step S403, the referring destination investigating unit 303 determines whether an actual file at the referring destination of the link file 501 exists in the local disk or remote disk. If the actual file exists in the local disk, the process advances to step S404; if it exists in the remote disk, to step S406. In step S404, the file replacing unit 304 investigates whether the actual file at the referring destination of the link file 501 can be acquired. If the actual file can be acquired, the process advances to step S405; if it cannot be acquired, to step S406. In step S405, the link file 501 to be copied is replaced with the actual file 502 at the referring destination.

In step S406, the target file is copied to the remote disk designated by the user. More specifically, when the process has reached step S406 via step S405, copy data of the actual file 502 is copied to the remote disk. When the process has directly reached step S406 from another step, the link file 501 designated by the user is copied to the remote disk.

<Pattern 2: Copy Processing of Structured File>

Figure 6:
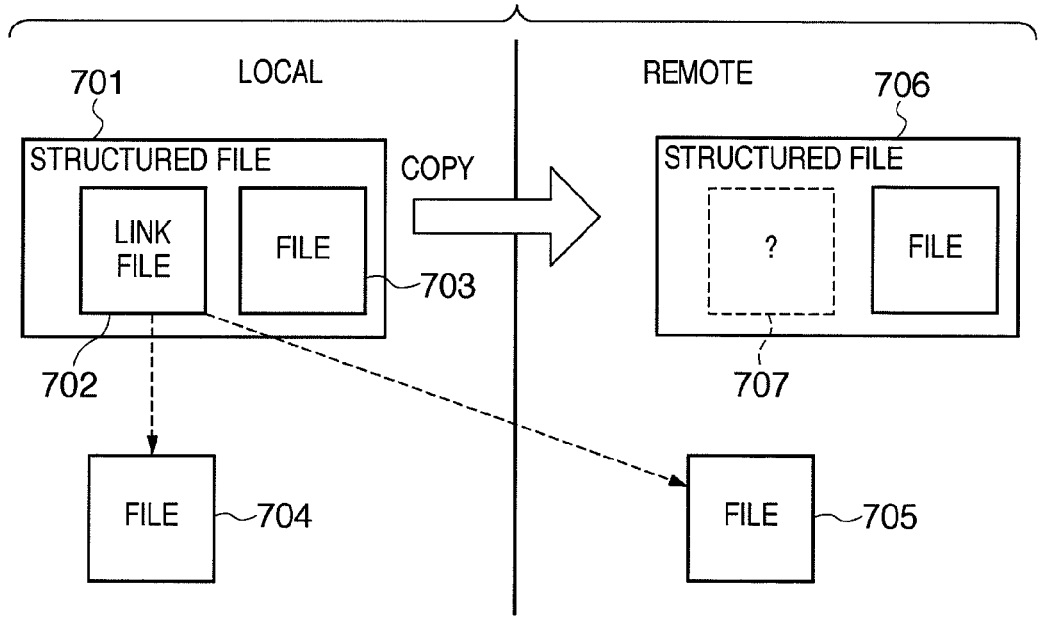
FIG. 6 is a conceptual view of copy processing of a structured file.

FIG. 6 is a conceptual view of copy processing of a structured file. Processing upon accepting an instruction from the user to copy (or move) a structured file from a local disk to a remote disk will be explained. In this case, a structured file 701 resides in the local disk and contains a link file 702. The referring destination of the link file 702 is a file 704 in the local disk or a file 705 in the remote disk.

Figure 7:
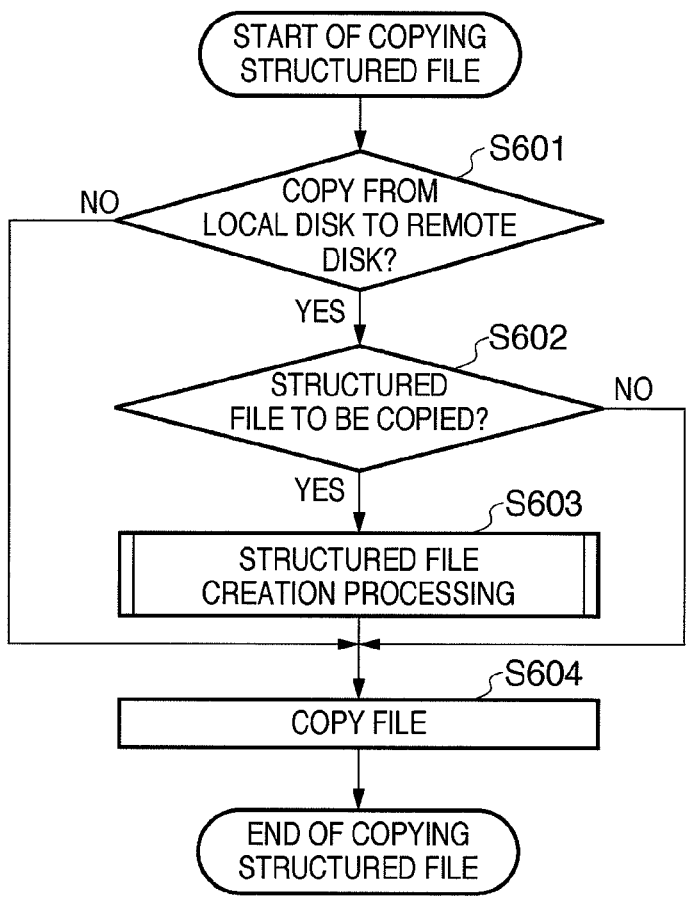
FIG. 7 is an operation flowchart of copy processing of a structured file.
Figure 8:
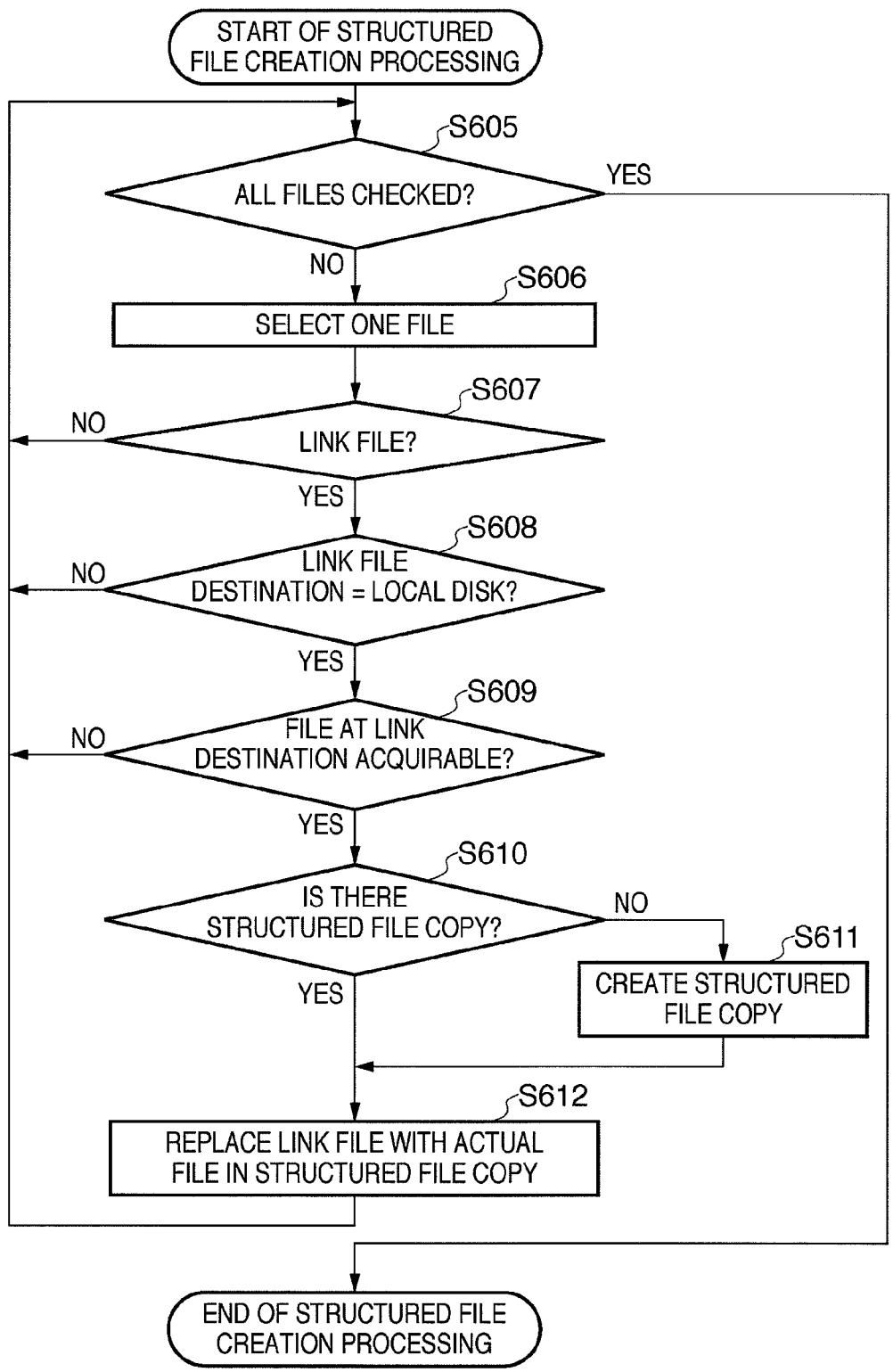
FIG. 8 is a detailed flowchart of structured file creation processing.

FIG. 7 is an operation flowchart of processing to copy a structured file from the local disk to the remote disk in the document management client 301. FIG. 8 is a detailed flowchart of structured file creation processing (S603).

In step S601, the file managing unit 302 determines whether copy processing designated by the user is copy processing of a file from the local disk to the remote disk. This determination does not depend on whether the copy source and copy destination are the file system or cabinet. If YES in step S601, the process advances to step S602; if NO, to step S604.

In step S602, the file type determining unit 305 determines whether the file to be copied is a structured file. If YES in step S602, the process advances to step S603; if NO, to step S604.

In step S603, a structured file is created by replacing files in the original structured file.

In step S605, the structured file investigating unit 306 determines whether all files contained in the structured file have been checked. If there are unchecked files, the structured file investigating unit 306 selects one file from the structured file in step S606. In step S607, the file type determining unit 305 checks whether the selected file is a link file.

In step S608, the referring destination investigating unit 303 checks whether the referring destination of the link file is a file in the local disk. In step S609, the file replacing unit 304 checks whether the referring destination of the link file can be acquired. If YES in step S609, it is determined in step S610 whether a structured file copy has already been prepared. If it is determined in step S610 that no structured file copy has been prepared, the file replacing unit 304 creates a structured file copy in step S611.

In step S612, the file replacing unit 304 replaces the link file 702 in the structured file copy with the actual file 704 at the referring destination.

In step S604, the target file is copied to the remote disk designated by the user. More specifically, when the process has reached step S604 via step S603, the structured file containing the actual file 704 is copied in the remote disk. When the process has directly reached step S604 from another step, the structured file 701 designated by the user is directly copied to the remote disk.

<Pattern 3: Copy Processing of Link File Referring to Structured File>

Figure 9:
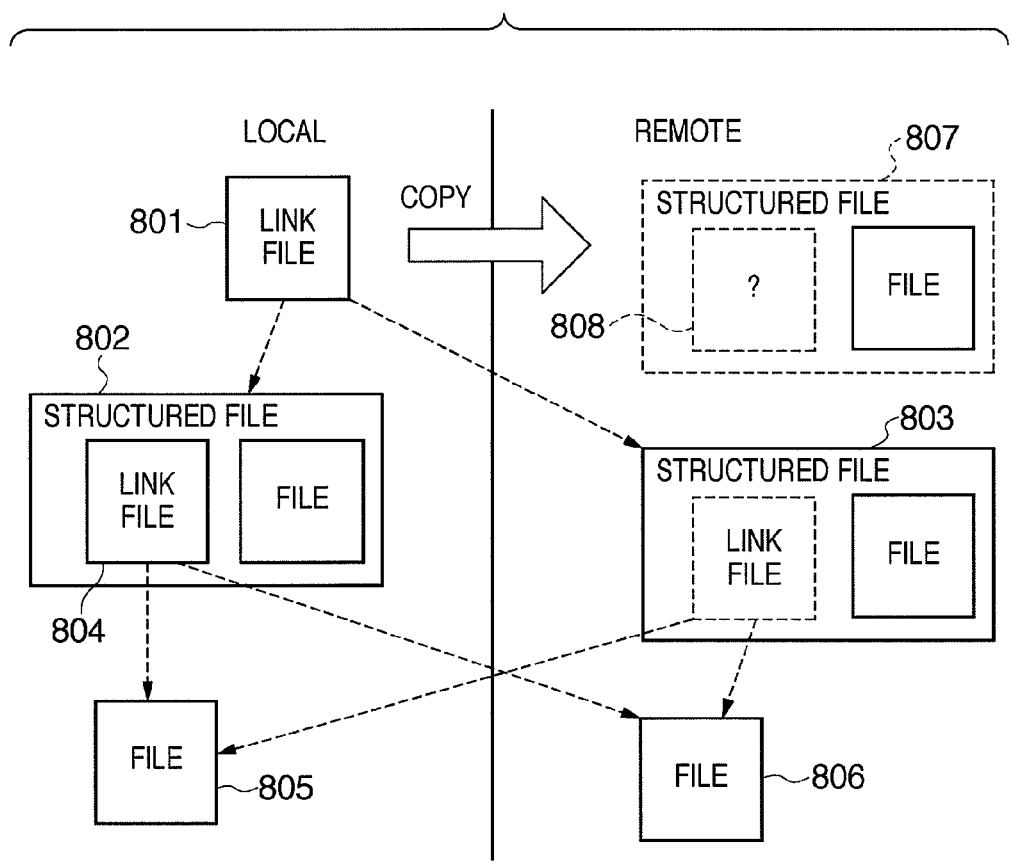
FIG. 9 is a conceptual view of copy processing of a link file referring to a structured file.

FIG. 9 is a conceptual view of copy processing of a link file referring to a structured file. Processing upon accepting an instruction from the user to copy (or move) a structured file from a local disk to a remote disk is implemented by a combination of FIGS. 5 and 7. Thus, a description of this operation flowchart will be omitted.

A link file 801 resides in the local disk, and its referring destination is a file 802 in the local disk or a file 803 in the remote disk. The files 802 and 803 are structured files. The referring destination of a link file 804 contained in the structured file 802 is a file 805 in the local disk or a file 806 in the remote disk.

If the referring destination of the link file 801 is the structured file 803 when copying the link file 801 to the remote disk, the link file 801 is directly copied. If the referring destination is the structured file 802, a structured file 807 replaced by the file replacing unit 304 is copied. In accordance with the referring destination of the original link file 804, the file replacing unit 304 replaces a link file 808 contained in the structured file 807 with the file 805.

Figure 10:
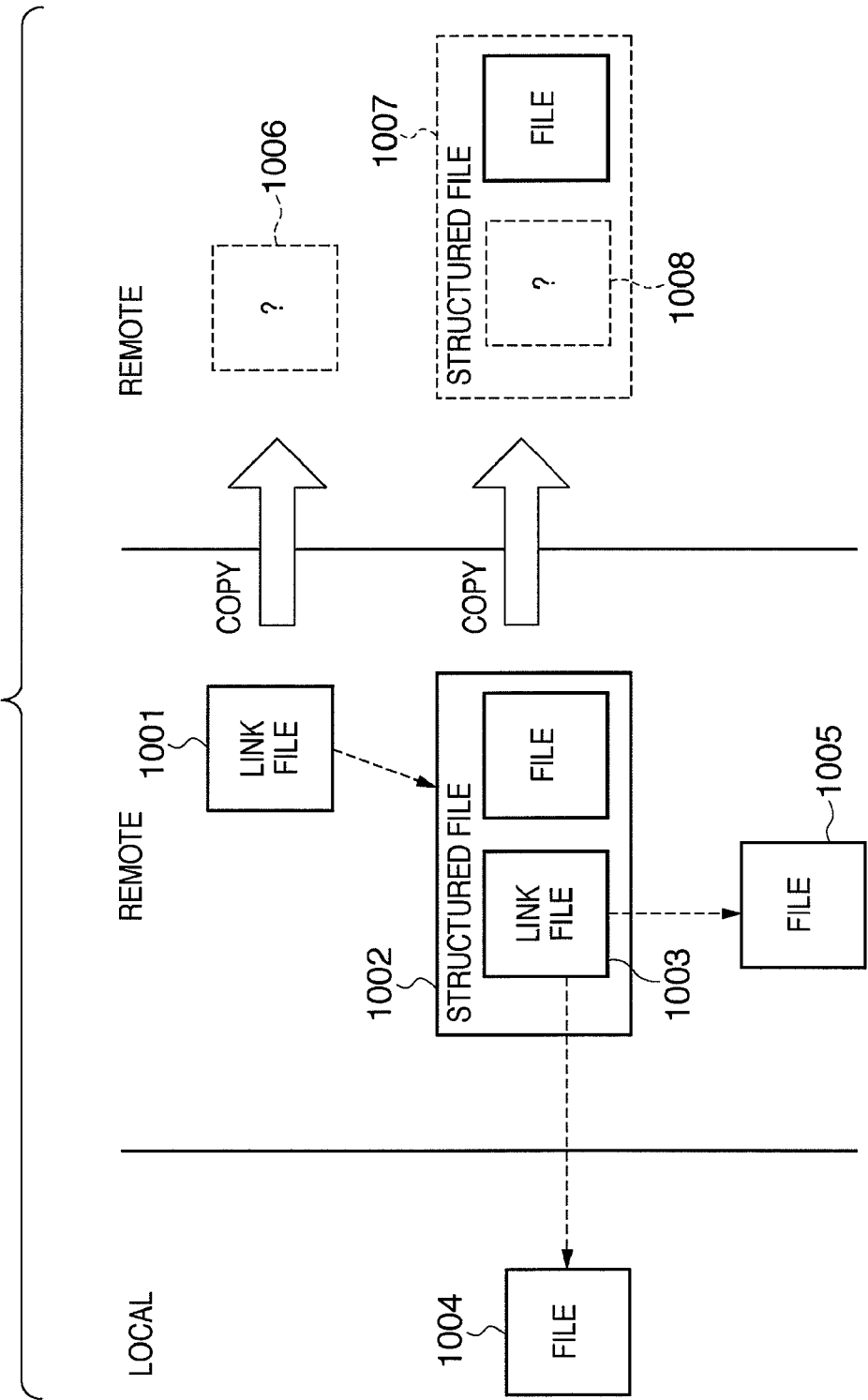
FIG. 10 is a conceptual view of copy processing of a link file (between remote disks)

FIG. 10 is a conceptual view when copying a link file from a remote disk to another remote disk.

A link file 1001 resides in the remote disk, and its referring destination is a structured file 1002. A link file 1003 in the structured file 1002 refers to a file 1004 in the local disk or a file 1005 in the remote disk.

When the user 104 has a right to alter the structured file 1002, the link file 1003 is replaced with the actual file 1004, and the link file 1001 is copied to the remote disk. When the user 104 does not have a right to alter the structured file 1002, the structured file 1002 is copied to the remote disk. A link file 1008 contained in a copied structured file 1007 is replaced with the file 1004 in accordance with the referring destination of the original link file 1003.

Figure 11:
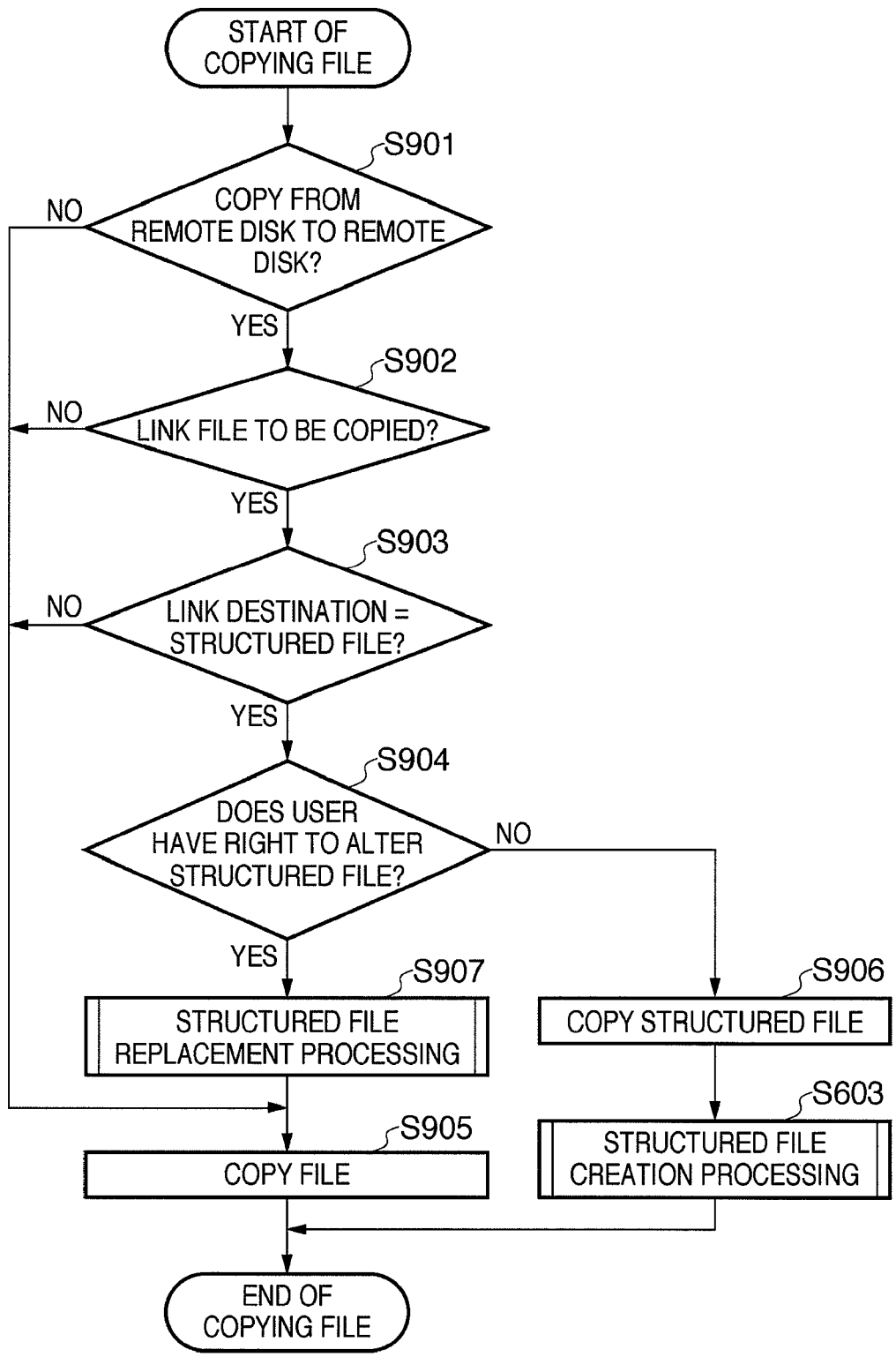
FIG. 11 is an operation flowchart of copy processing of a link file (between remote disks)
Figure 12:
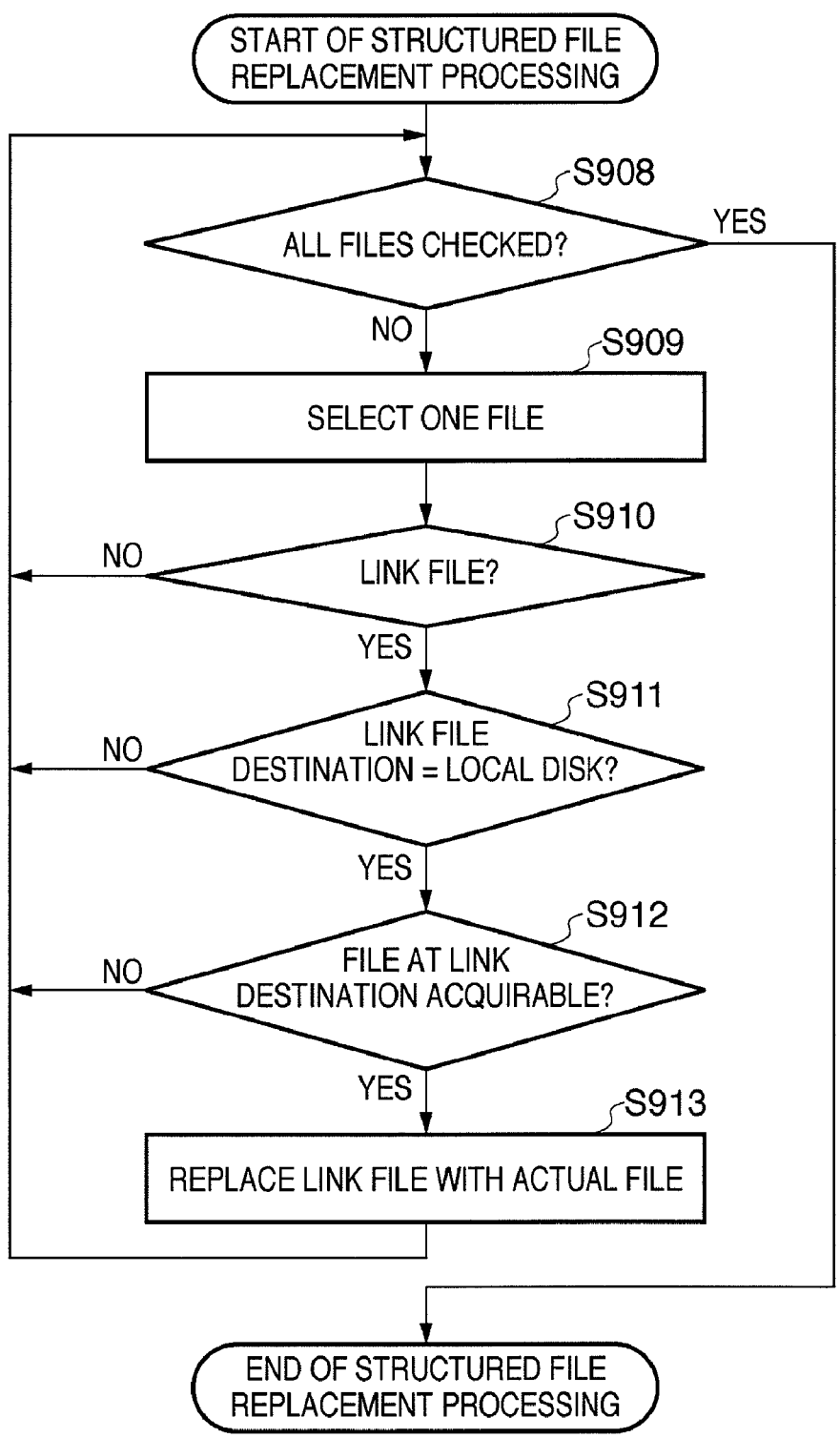
FIG. 12 is a detailed flowchart of structured file replacement processing.

FIG. 11 is an operation flowchart of processing to copy a link file referring to a structured file from a remote disk to another remote disk in the document management client 301. FIG. 12 is a detailed flowchart of structured file replacement processing (S907).

In step S901, the file managing unit 302 checks whether to copy a file from a remote disk to another remote disk. Similar to FIGS. 5 and 7, this determination does not depend on whether the copy source and copy destination are the file system or cabinet. If YES in step S901, the process advances to step S902; if NO, to step S905.

In step S902, the file type determining unit 305 determines whether the file to be copied is a link file. If YES in step S902, the process advances to step S903; if NO, to step S905.

In step S903, the file type determining unit 305 determines whether the file to be copied is a structured file. If YES in step S903, the process advances to step S904; if NO, to step S905.

In step S904, the alteration right investigating unit 307 checks whether the user 104 has a right to alter the structured file. If the user 104 has the right, the process advances to step S907; if the user 104 does not, to step S906.

In step S907, a file in the structured file at the referring destination of the link file is replaced.

Processes in steps S908 to S912 are the same as those in steps S605 to S609 of FIG. 8, and a description thereof will be omitted. In step S913, the file replacing unit 304 replaces the link file in the structured file with an actual file at the referring destination of the link file. In step S905, the file managing unit 302 copies the link file referring to the structured file.

If the alteration right investigating unit 307 determines in step S904 that the user 104 does not have the alteration right, the file managing unit 302 copies the structured file itself. After that, a structured file copy is newly created, similar to steps S605 to S612.

<Pattern 4: Path Conversion Processing of Link File>

Processing premised on a case in which a file to be copied (or moved) is shared not in the cabinet but in the file system via the network will be explained. In any pattern described above, even if the referring destination investigating unit 303 determines that the target file exists in a local disk, it is checked whether another user on the network can refer to a file at the referring destination. If the file is shared in the file system via the network, link information (path information) contained in the link file is converted. The following link information conversion allows normally referring to an actual file at the referring destination by using a link file at the copy destination without replacement with an actual file.

Figure 13:
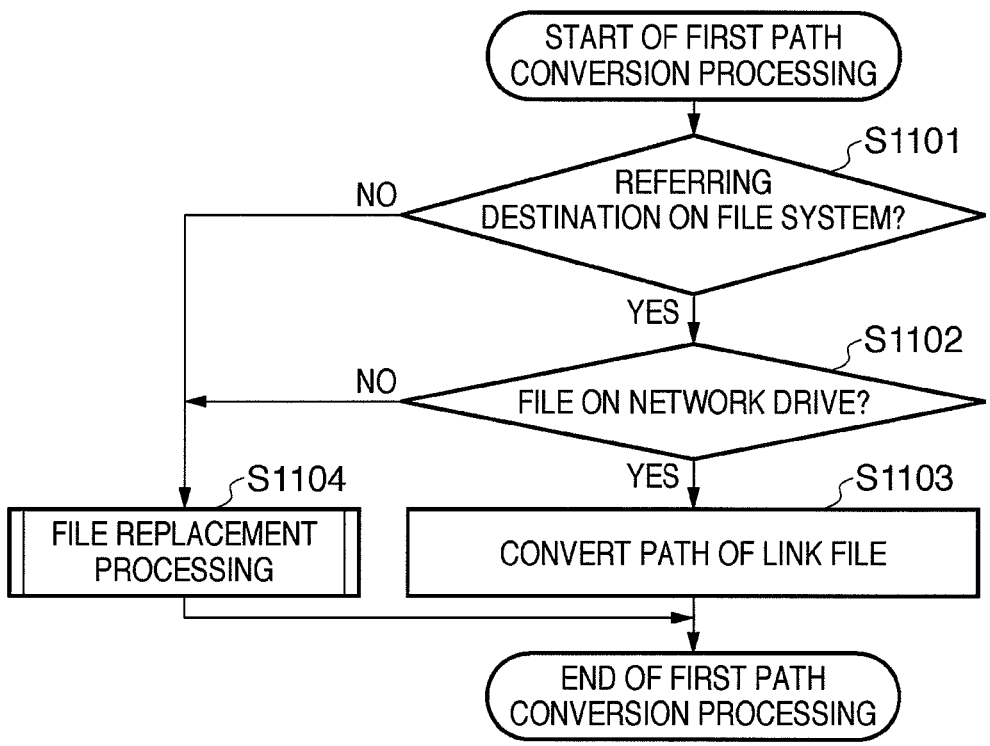
FIG. 13 is a flowchart of path information conversion processing.
Figure 14:
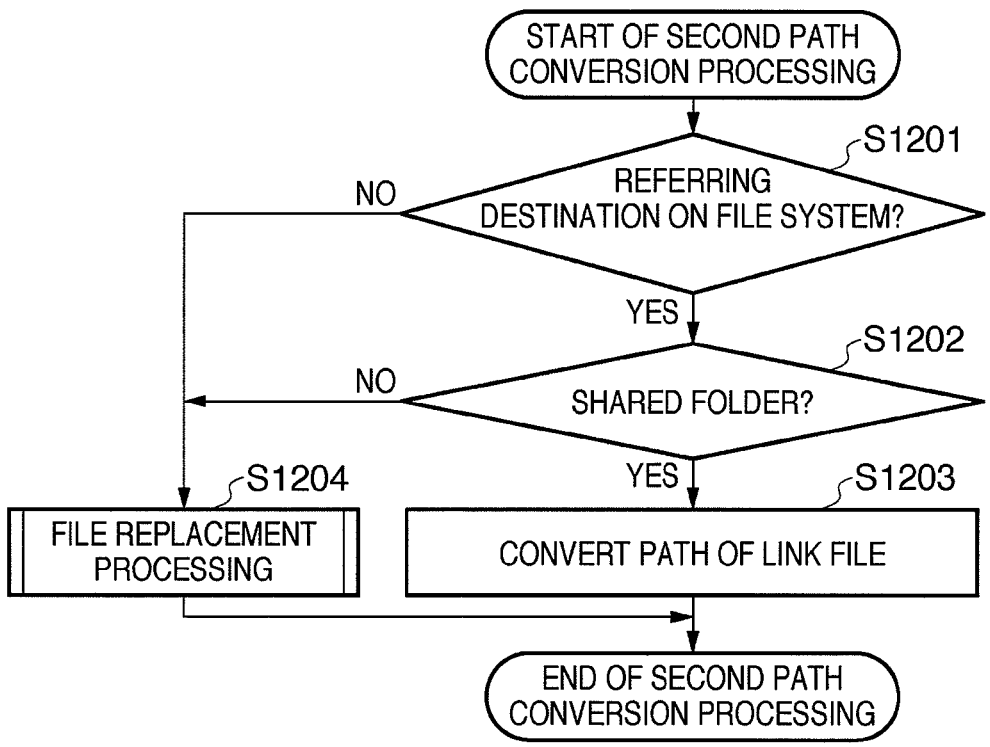
FIG. 14 is a flowchart of another path information conversion processing.

FIGS. 13 and 14 are flowcharts of processing to convert path information contained in a link file. FIG. 14 is different from FIG. 13 in only step S1202.

In step S1101, it is checked whether the referring destination (actual file) of a link file exists on the file system. If the referring destination of a link file exists on the file system, the process advances to step S1102; if it does not, to step S1104.

In step S1102, the referring destination investigating unit 303 checks whether a drive which stores the actual file is a mounted network drive (path information determining unit). For example, the referring destination investigating unit 303 determines whether the drive is represented by "X:\data\test.doc." If the drive is a mounted one, the process advances to step S1103; if it is not, to step S1104.

In step S1202 of FIG. 14, the referring destination investigating unit 303 checks whether a folder which stores the file is shared.

In step S1103, the link information converting unit 308 converts referring destination information of the link file into a format referable from another client PC on the network.

FIG. 15 is a table exemplifying link information converted by the link information converting unit 308.

Link information 1301 before conversion adopts a representation complying with a file system mounted as a local drive. More specifically, a format containing a drive letter upon mounting is used as an address representation valid in only a local PC. Converted link information 1302 adopts a UNC (Universal Naming Convention) notation. The UNC is a kind of address representation commonly used by a plurality of network-connected computers. The UNC is mainly employed in Windows® which is an operating system (OS) available from Microsoft.

Note that the converted link information may comply with another description method as long as the description is an address representation commonly usable by a plurality of network-connected computers. For example, a URI (Uniform Resource Identifier) notation is available.

In step S1104, file replacement processing is done. This processing is the same as steps S404 and S405 of FIG. 5, and a description thereof will not be repeated.

As described above, upon accepting file copy processing from a user, the information processing apparatus according to the first embodiment replaces a link file with an actual file at the referring destination and then executes copy processing. The information processing apparatus performs this replacement particularly in accordance with storing locations before and after copying the file, and the type of file. When a link file referring to another file or a structured file containing the link file is copied, this arrangement allows the user to access an appropriate actual file based on the copied file.

Even when a structured file has a multiple nested structure, the user can access a proper actual file by recursively executing the foregoing processing.

Second Embodiment

The second embodiment will explain processing when attaching a file to e-mail and sending it. A system configuration (FIG. 1) and a hardware configuration (FIG. 2) are almost the same as those in the first embodiment, and a description thereof will not be repeated. Mail sending is different from general file copy or move mainly in additional processing of creating a link file from a file.

<Functional Block Configuration of Document Management System>

Figure 16:
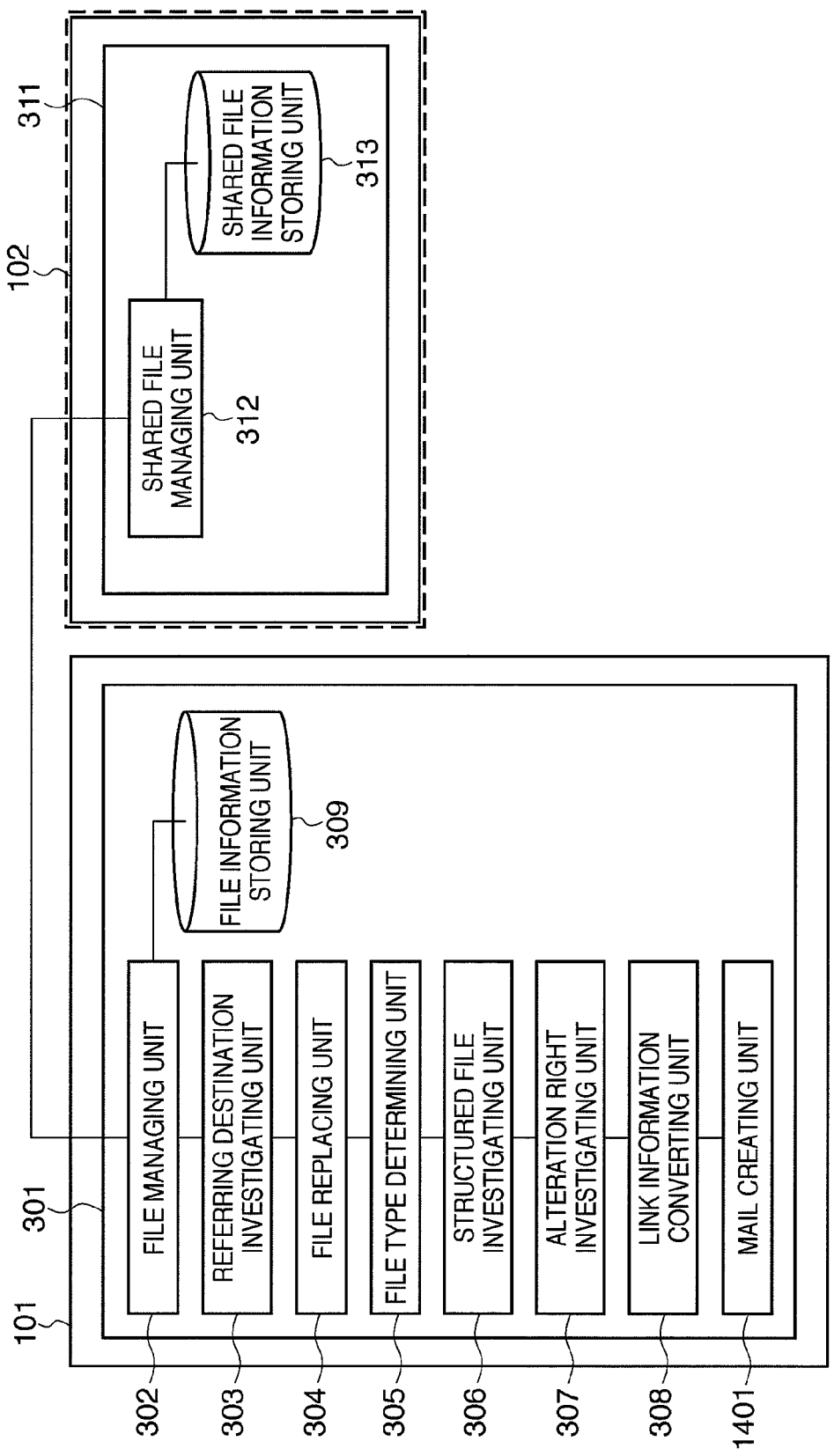
FIG. 16 is a block diagram showing the functional block configuration of a document management system according to the second embodiment.

FIG. 16 is a block diagram showing the functional block configuration of a document management system according to the second embodiment. FIG. 16 is different from FIG. 3 in that a CPU 200 executes a document management client 301 to further implement a mail creating unit 1401 capable of sending e-mail.

When a user 104 is to attach a file to e-mail and send it, the mail creating unit 1401 replaces a link file with an actual file at the referring destination in accordance with the storing location of the file and the type of file. Then, the mail creating unit 1401 attaches the file to e-mail and sends it.

<Pattern 5: File Transmission Processing by E-mail>

Figure 17:
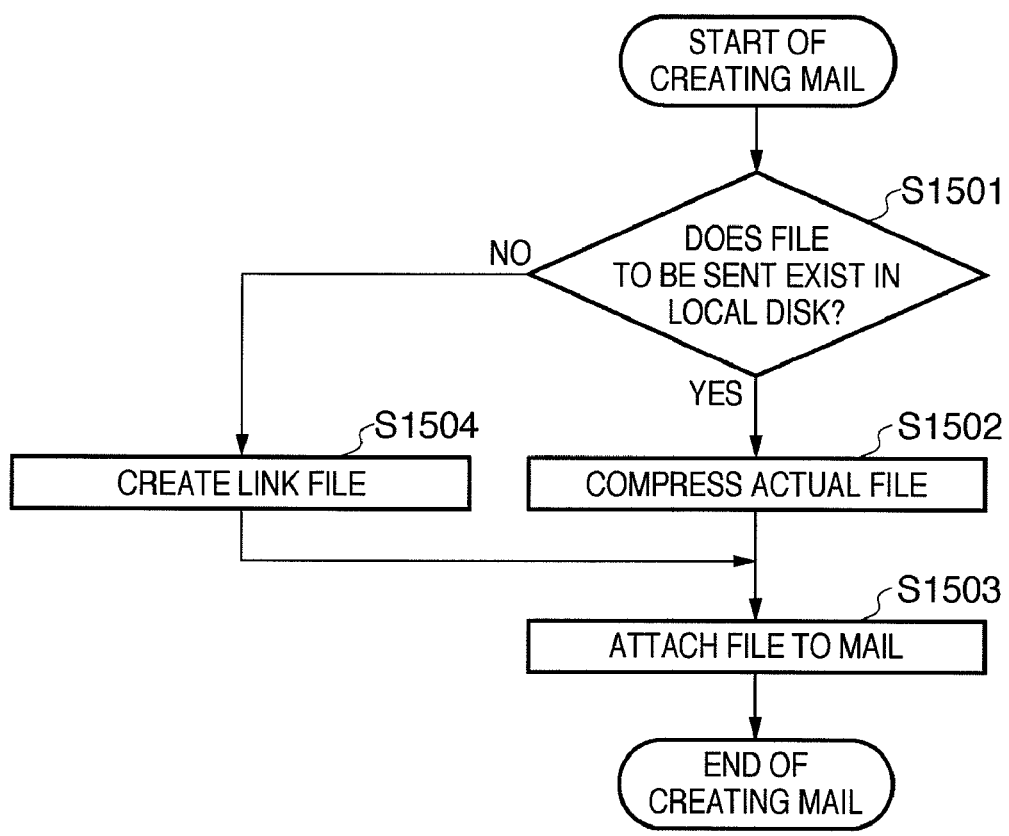
FIG. 17 is a conceptual view of processing when attaching a file to e-mail and sending it.

FIG. 17 is a conceptual view of processing when attaching a file to e-mail and sending it.

In step S1501, the mail creating unit 1401 determines whether a file to be sent exists in a local disk or remote disk. If the mail creating unit 1401 determines that the file exists in the local disk, the process advances to step S1502; if it does not, to step S1504.

In step S1502, the mail creating unit 1401 acquires the file and compresses the acquired file. In step S1503, the mail creating unit 1401 attaches, to e-mail, the file compressed in step S1502. At this time, when the size of the compressed file exceeds a threshold set by the user in advance, a display unit (not shown) may display a warning message. It is also possible to copy the file by the user to a predetermined remote disk area, create a link file to the file, and attach the link file.

In step S1504, the mail creating unit 1401 creates the link file of the file. In step S1503, the mail creating unit 1401 attaches, to e-mail, the link file created in step S1504.

When a file selected by the user for mail sending is a link file, the same processing as the flowchart of FIG. 5 is performed. When a file selected by the user is a structured file, the processing is implemented by a combination of the processes of FIGS. 7 and 17 and a description thereof will not be repeated.

Figure 18:
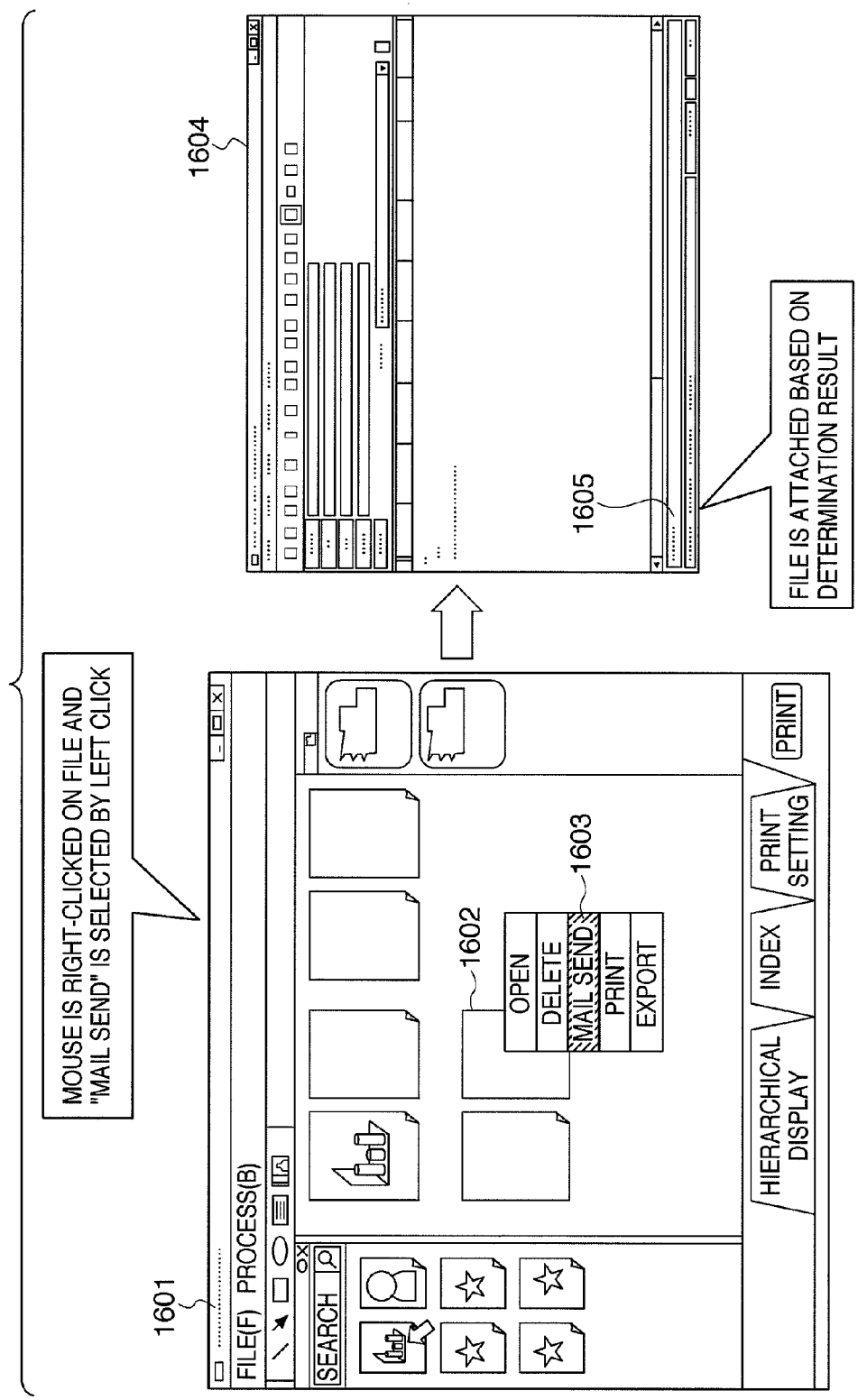
FIG. 18 is a view exemplifying a user interface (UI) when creating mail.

FIG. 18 is a view exemplifying a user interface (UI) when creating mail. This UI is merely an example, and the present invention is not limited to this. A mail creation window and mailer may be prepared as some functions of the document management client 301 or as another application.

Reference numeral 1601 denotes a main UI of the document management client 301 that lists stored files. In this case, the user 104 selects a file 1602. When the user selects "mail send" from a menu 1603, the processing in FIG. 17 is executed. Then, a mail sending window 1604 appears. A file 1605 to be attached is a file itself selected by the user 104 or a link file.

As described above, upon accepting, from a user, processing of attaching a file to e-mail, the information processing apparatus according to the second embodiment replaces a link file with an actual file at the referring destination in accordance with the storing location of the file, and then executes copy processing. This arrangement allows a user who receives the e-mail to receive the actual file or the link file accessible to the correct actual file.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-021744, filed Feb. 2, 2009, which is hereby incorporated by reference herein in its entirety.

What is claimed is:

1. An information processing apparatus connected to a communication network, the apparatus comprising:
   at least one processor;
   a designating unit which designates first electronic data to be moved or copied to a predetermined data storing position;
   a data type determining unit which determines whether the first electronic data designated by said designating unit is link data to second electronic data;
   a path information determining unit which, when said data type determining unit determines that the first electronic data designated by said designating unit is link data to the second electronic data, determines whether path information to the second electronic data contained in the link data is local path information used by only the information processing apparatus;
   an acquisition unit which, when said path information determining unit determines that the path information is local path information, acquires universal path information representing the data storing position commonly used via the communication network;
   an acquisition determining unit which, when said acquisition unit has not been able to acquire the universal path information representing the data storing position, determines whether the second electronic data linked to the link data can be acquired; and
   a file processing unit which, when said acquisition unit has acquired the universal path information representing the data storing position, moves or copies, to the predetermined data storing position, link data obtained by replacing the path information with the universal path information, and which, when said acquisition determining unit determines that the second electronic data can be acquired, moves or copies, to the predetermined data storing position, a copy of the second electronic data instead of the link data.

2. The apparatus according to claim 1, wherein
   said data type determining unit further determines whether the first electronic data designated by said designating unit is first structured data containing the link data to the second electronic data,
   when said data type determining unit determines that the first electronic data designated by said designating unit is the first structured data containing the link data to the second electronic data, said path information determining unit determines whether path information to the second electronic data contained in the link data is local path information used by only the information processing apparatus, and when said acquisition determining unit determines that the second electronic data can be acquired, said file processing unit moves or copies, to the predetermined data storing position, structured data obtained by replacing the link data with the copy of the second electronic data.

3. An information processing apparatus connected to a communication network, the apparatus comprising:

at least one processor;

a designating unit which designates first electronic data to be moved or copied to a predetermined data storing position;

a data type determining unit which determines whether the first electronic data designated by said designating unit is either of link data to second electronic data and structured data containing the link data;

a path information determining unit which, when said data type determining unit determines that the first electronic data designated by said designating unit is either of link data to the second electronic data and structured data containing the link data, determines whether path information to the second electronic data contained in the link data is local path information used by only the information processing apparatus;

an acquisition unit which, when said path information determining unit determines that the path information is local path information, acquires universal path information representing the data storing position commonly used via the communication network; and a file processing unit which, when said acquisition unit has acquired the universal path information representing the data storing position, moves or copies, to the predetermined data storing position, either of link data obtained by replacing the path information with the universal path information and structured data containing the link data, and when said acquisition unit has not been able to acquire the universal path information representing the data storing position, moves or copies, to the predetermined data storing position, either of copy data of the second electronic data and structured data containing the copy data.

4. The apparatus according to claim 3, further comprising sharing determining unit which determines whether a folder that stores the second electronic data is shared with a terminal connected to the communication network, wherein when said sharing determining unit determines that the folder is not shared, said file processing unit moves or copies, to the predetermined data storing position, either of copy data of the second electronic data and structured data containing the copy data.

5. An information processing apparatus which is connected to a communication network and can send e-mail, the apparatus comprising:

at least one processor;

a designating unit which designates first electronic data to be attached to e-mail;

a data type determining unit which determines whether the first electronic data designated by said designating unit is either of link data to second electronic data and structured data containing the link data;

a path information determining unit which, when said data type determining unit determines that the first electronic data designated by said designating unit is either of link data to the second electronic data and structured data containing the link data, determines whether path information to the second electronic data contained in the link data is local path information used by only the information processing apparatus;

an acquisition unit which, when said path information determining unit determines that the path information is local path information, acquires universal path information representing the data storing position commonly used via the communication network; and a mail sending unit which, when said acquisition unit has acquired the universal path information representing the data storing position, attaches, to the e-mail, either of link data obtained by replacing the path information with the universal path information and structured data containing the link data and sends the e-mail, and when said acquisition unit has not been able to acquire the universal path information representing the data storing position, attaches, to the e-mail, either of copy data of the second electronic data representing the path information and structured data containing the copy data and sends the e-mail.

6. The apparatus according to claim 5, wherein the universal path information is described using either of URI and UNC notations.

7. A method of controlling an information processing apparatus connected to a communication network, the method comprising:

a designating step of designating first electronic data to be moved or copied to a predetermined data storing position;

a data type determining step of determining whether the designated first electronic data designated in the designating step is link data to second electronic data;

a path information determining step of, when it is determined in the data type determining step that the first electronic data designated in the designating step is link data to the second electronic data, determining whether path information to the second electronic data contained in the link data is local path information used by only the information processing apparatus;

an acquisition step of, when it is determined in the path information determining step that the path information is local path information, acquiring universal path information representing data storing position commonly used via the communication network;

an acquisition determining step of, when the universal path information has not been acquired in the acquisition step, determining whether the second electronic data linked to the link data can be acquired; and a file processing step of, when the universal path information has been acquired in the acquisition step, moving or copying, to the predetermined data storing position, link data obtained by replacing the path information with the universal path information, and when it is determined in the acquisition determining step that the second electronic data can be acquired, moving or copying, to the predetermined data storing position, copy data of the second electronic data instead of the link data.

8. A method of controlling an information processing apparatus connected to a communication network, the method comprising:

a designating step of designating first electronic data to be moved or copied to a predetermined data storing position;

a data type determining step of determining whether the first electronic data designated in the designating step is either of link data to second electronic data and structured data containing the link data;

a path information determining step of, when it is determined in the data type determining step that the first electronic data designated in the designating step is either of the link data and the structured data, determining whether path information to the second electronic data contained in the link data is local path information used by only the information processing apparatus;

an acquisition step of, when it is determined in the path information determining step that the path information is local path information, acquiring universal path information representing the data storing position commonly used via the communication network; and a file processing step of, when the universal path information has been acquired in the acquisition step, moving or copying, to the predetermined data storing position, either of link data obtained by replacing the path information with the universal path information and structured data containing the link data, and when the universal path information representing the data storing position has not been able to be acquired in the acquisition step, moving or copying, to the predetermined data storing position, either of copy data of the second electronic data and structured data containing the copy data.

9. A method of controlling an information processing apparatus which is connected to a communication network and can send e-mail, the method comprising:

a designating step of designating first electronic data to be attached to e-mail;

a data type determining step of determining whether the first electronic data designated in the designating step is either of link data to second electronic data and structured data containing the link data;

a path information determining step of, when it is determined in the data type determining step that the first electronic data designated in the designating step is either of the link data and the structured data, determining whether path information to the second electronic data contained in the link data is local path information used by only the information processing apparatus;

an acquisition step of, when it is determined in the path information determining step that the path information is local path information, acquiring universal path information representing the data storing position commonly used via the communication network; and a mail sending step of, when the universal path information has been acquired in the acquisition step, attaching, to the e-mail, either of link data obtained by replacing the path information with the universal path information and structured data containing the link data and sending the e-mail, and when the universal path information has not been able to be acquired in the acquisition step, attaching, to the e-mail, either of copy data of the second electronic data and structured data containing the copy data and sending the e-mail.

* * * * *